(12) United States Patent
Okawa et al.

(10) Patent No.: US 7,642,209 B2
(45) Date of Patent: Jan. 5, 2010

(54) SILICON NITRIDE SINTERED MATERIAL AND METHOD FOR MANUFACTURING

(75) Inventors: Yoshihiro Okawa, Kirishima (JP); Takehiro Oda, Kirishima (JP)

(73) Assignee: Kyocera Corporation, Kyoto (JP)

( * ) Notice: Subject to any disclaimer, the term of this patent is extended or adjusted under 35 U.S.C. 154(b) by 656 days.

(21) Appl. No.: 10/569,753

(22) PCT Filed: Aug. 25, 2004

(86) PCT No.: PCT/JP2004/012188

§ 371 (c)(1),
(2), (4) Date: Oct. 6, 2006

(87) PCT Pub. No.: WO2005/019133

PCT Pub. Date: Mar. 3, 2005

(65) Prior Publication Data

US 2007/0184569 A1    Aug. 9, 2007

(30) Foreign Application Priority Data

Aug. 26, 2003  (JP)  ............................. 2003-301102
Nov. 27, 2003  (JP)  ............................. 2003-398234

(51) Int. Cl.
*C04B 35/591* (2006.01)
*C04B 35/596* (2006.01)

(52) U.S. Cl. .................. 501/97.1; 501/97.4; 264/647; 264/676; 264/683

(58) Field of Classification Search ................ 501/97.1, 501/97.4; 264/647, 676, 683
See application file for complete search history.

(56) References Cited

U.S. PATENT DOCUMENTS 6,297,184 B1    10/2001    Fukudome et al.

FOREIGN PATENT DOCUMENTS

| DE | 10007780 | 10/2000 |
|----|----------|---------|
| JP | 05-148031 | 6/1993 |
| JP | 09-268072 | 10/1997 |
| JP | 10-212167 | 8/1998 |
| JP | 10-245268 | 9/1998 |
| JP | 11-267538 | 10/1999 |
| JP | 2001-106576 | 4/2001 |
| JP | 2001-206774 | 7/2001 |
| JP | 2002-020160 | 1/2002 |

OTHER PUBLICATIONS

Machine translation of JP 05148031, Jun. 15, 1993.*
Machine translation of JP 09-268072, Oct. 14, 1997.*

* cited by examiner

*Primary Examiner*—Karl E Group
(74) *Attorney, Agent, or Firm*—Hogan & Hartson LLP (57) ABSTRACT

A silicon nitride sintered material includes a silicon nitride crystal and a grain boundary layer that contains at least two of a first metal silicide (a metal silicide having, as a first metal element, at least one selected from the group consisting of Fe, Cr, Mn and Cu), a second metal silicide (a metal silicide having, as a second metal element, at least one of W or Mo) and a third metal silicide (a metal silicide having a plurality of metal elements including the first metal element and the second metal element), wherein the grain boundary layer has neighboring phase where at least two of the first through third metal silicides exist in contact with each other.

17 Claims, 1 Drawing Sheet

Fig.1

SILICON NITRIDE SINTERED MATERIAL AND METHOD FOR MANUFACTURING

This application is a national phase of PCT application PCT/JP2004/012188 filed on Aug. 25, 2004, which claims priority to Japanese Patent Application No. 20003-301102 filed on Aug. 26, 2003, and Japanese Patent Application No. 2003-398234 filed on Nov. 27, 2003, the contents of all of which are incorporated by reference in their entirety.

TECHNICAL FIELD

The present invention relates to a silicon nitride sintered material that is excellent in thermal characteristics and in mechanical characteristics, and particularly to a silicon nitride sintered material that is excellent in thermal shock resistance and mechanical strength and a method for manufacturing the same. The present invention also relates to various members formed from the silicon nitride sintered material, and particularly to a molten-metal-resistant member that is most suitably used in metal casting and a wear resistant member that is most suitably used in crushing machines.

BACKGROUND ART

The silicon nitride sintered material, that is a material excellent in thermal characteristics and in mechanical characteristics, has been described in various Patent Documents and technical literature.

Especially noteworthy is a silicon nitride sintered material having silicides of Fe, W, Cr, Mo or the like caused to precipitate in the grain boundary layers thereof for the purpose of improving the mechanical properties (refer to Patent Documents 1 through 4).

For example, Patent Document 2 describes a silicon nitride sintered material that has crystal grains of silicide of at least one of W, Mo, Cu, Mn, Fe and Nb dispersed in the grain boundary layers of the sintered material. Patent Document 3 describes a silicon nitride sintered material that has compound of metal having a high melting point, Fe—Si—O, formed in the grain boundary layers thereof. Patent Document 4 describes a silicon nitride sintered material that contains grains formed from silicides of W, Fe or the like and Ti compound (nitride, carbonitride or carbonate nitride) in the grain boundary layers thereof, while the silicides of W, Fe or the like coagulate around the Ti compound.

Patent Document 1: Japanese Unexamined Patent Publication (Kokai) No. 5-148031
Patent Document 2: Japanese Unexamined Patent Publication (Kokai) No. 2001-206774
Patent Document 3: Japanese Unexamined Patent Publication (Kokai) No. 2001-106576
Patent Document 4: Japanese Unexamined Patent Publication (Kokai) No. 11-267538

DISCLOSURE OF THE INVENTION

Problems to be Solved by the Invention

However, the silicon nitride sintered materials disclosed in Patent Documents 1 through 4 have the drawback of insufficient mechanical strength. For example, while a mechanical stress may be generated in a silicon nitride sintered material when it is subjected to compressive, tensile or torsional force or the like, the stress is likely to be concentrated in the individual metal silicide since the metal silicide is contained in the grain boundary layers. As a result, fracture begins at the metal silicide where the stress is concentrated, leading to cracks generated between silicon nitride crystal grains and metal silicide, thus decreasing the mechanical strength.

In the case of a material wherein there is a significant difference in thermal expansion coefficient between the silicon nitride crystal and the metal silicide, there is also a problem of low resistance against thermal shock. For example, when silicide of W and silicide of Fe are contained, the material involves significant difference in thermal expansion coefficient between the silicon nitride crystal and the silicide of W, and between the silicon nitride crystal and the silicide of Fe. As a result, when thermal stress is generated in the silicon nitride sintered material due to thermal shock, cracks are likely to occur between the silicon nitride crystal and the metal silicide, thus resulting in a decrease in the thermal shock resistance.

The present invention has been made in consideration of the problems described above, and has an object of providing a silicon nitride sintered material that is improved in mechanical characteristics and in thermal characteristics, particularly in thermal shock resistance and mechanical strength, and a method for manufacturing the same.

Another object of the present invention is to provide various members formed from the silicon nitride sintered material, particularly a molten-metal-resistant member and a wear resistant member.

Means for Solving the Problems

The silicon nitride sintered material of the present invention comprises a silicon nitride crystal and a grain boundary layer that contains at least two of first through third metal suicides described below,
wherein the grain boundary layer has a neighboring phase where at least two of the first through third metal silicides exist in contact with each other.

First metal silicide: A metal silicide comprising, as a first metal element, at least one selected from the group consisting of Fe, Cr, Mn and Cu.

Second metal silicide: A metal silicide comprising, as a second metal element, at least one of W or Mo.

Third metal silicide: A metal silicide comprising a plurality of metal elements including the first metal element and the second metal element.

It is preferable that the first metal element is Fe and the second metal element is W.

The neighboring phase is preferably formed such that the first metal silicide surrounds the second metal silicide or the third metal silicide.

The crystal of the silicon nitride preferably has mean grain size of 15 μm or less.

It is preferable that the total content of the first metal element is in a range from 0.2 to 10% by weight and the total content of the second metal element is in a range from 0.1 to 3% by weight, while the content of the first metal element is higher than the content of the second metal element.

The silicon nitride sintered material is preferably made through firing and molding powders comprising: a Si powder or a mixture of a Si powder and a silicon nitride powder; a powder including a compound of the first metal element and having a mean grain size of 0.5 to 20 μm; and a powder including a compound of the second metal element and having a mean grain size of 0.1 to 5 μm.

The neighboring phase is preferably formed such that the second metal silicide surrounds the first metal silicide or the third metal silicide.

It is preferable that the total content of the first metal element is in a range from 0.01 to 2% by weight and the total content of the second metal element is in a range from 0.2 to 10% by weight, while the proportion of the second metal element is higher than the proportion of the first metal element.

The silicon nitride sintered material is preferably made through firing and molding powders comprising: a Si powder or a mixture of a Si powder and a silicon nitride powder; a powder including a compound of the first metal element and having a mean grain size in a range from 0.1 to 5 μm; and a powder including a compound of the second metal element and having a mean grain size in a range from 1 to 30 μm.

The method for manufacturing the silicon nitride sintered material of the present invention comprises: preparing a material powder by mixing a preliminarily mixed powder that has been made by wet mixing and drying materials including a Si powder or a mixture of a Si powder and a silicon nitride powder; a compound of first metal element having a mean grain size in a range from 0.1 to 20 μm and having at least one selected from the group consisting of Fe, Cr and Mn; and a compound of second metal element having a mean grain size in a range from 0.1 to 30 μm and having at least one of W or Mo;

forming a compact including the material powder and an organic binder;

degreasing the organic binder in an atmosphere substantially consisting of nitrogen gas, argon gas or a mixed gas thereof to form a degreased compact;

transforming the degreased compact to a nitride material in a substantially nitrogen gas atmosphere; and firing the nitride material in a non-oxidizing atmosphere that contains nitrogen gas to form a sintered material.

It is preferable that the preliminarily mixed powder comprises the compound of first metal element having a mean grain size in a range from 0.5 to 20 μm and the compound of second metal element having a mean grain size in a range from 0.1 to 5 μm, and that the total content of the first metal element in the silicon nitride sintered material is in a range from 0.2 to 10% by weight and that of the second metal element is in a range from 0.1 to 3% by weight, while the content of the first metal element is higher than that of the second metal element.

The temperature lowering rate in the firing process is preferably 50° C. per hour or faster.

It is preferable that the preliminarily mixed powder comprises the compound of first metal element having a mean grain size in a range from 0.1 to 5 μm and the compound of second metal element having a mean grain size in a range from 1 to 30 μm, and that the silicon nitride sintered material is formed so that the total content of the first metal element in the silicon nitride sintered material is in a range from 0.01 to 2% by weight and that of the second metal element is in a range from 0.2 to 10% by weight, while the content of the second metal element is higher than that of the first metal element.

The molten-metal-resistant member of the present invention is characterized in that the silicon nitride sintered material described above is used.

The wear resistant member of the present invention is characterized in that the silicon nitride sintered material described above is used.

Effect of the Invention

The inventors of the present application found that, when neighboring phase is provided where at least two of the first through third metal silicides make contact with each other, it is made possible to prevent mechanical stress and thermal stress from concentrating in the individual metal silicides and thereby improve the thermal shock resistance and mechanical strength of the silicon nitride sintered material. Thus according to the present invention, the silicon nitride sintered material that is excellent in thermal shock resistance and in mechanical strength can be provided.

[Description of Reference Numerals]
10: Cut surface of silicon nitride sintered material
12: Silicon nitride crystal
14: Neighboring phase
16, 16a, 16b, 16c: First metal silicide
18, 18a, 18b, 18c: Second metal silicide
20: Grain boundary layer
22: Third metal silicide

BEST MODE FOR CARRYING OUT THE INVENTION

The present invention will now be described in detail.

The silicon nitride sintered material of the present invention has silicon nitride crystal and grain boundary layers that contain at least two of the first through third metal silicides to be described below, where the grain boundary layers have neighboring phase where at least two of the first through third metal silicides make contact with each other.

The first metal element refers to at least one selected from among a group consisting of Fe, Cr, Mn and Cu, and suicides of the first metal elements are referred to as first metal silicide. The second metal element refers to at least one of W and Mo, and silicides of the second metal elements are referred to as second metal silicide. The third metal element refers to a collection of a plurality of metal components containing the first metal element and the second metal element, for example metal component containing W and Fe, and silicides of the third metal elements are referred to as third metal silicide.

Silicon nitride crystal consists mainly of acicular crystals such as type β silicon nitride crystal and β'-sialon crystal that has the same crystal structure as that of β silicon nitride crystal, with mean grain size of 30 μm or less. The mean grain size in this case means the mean length of the acicular crystal grains. This enables it to improve the mechanical characteristics such as mechanical strength and thermal characteristics such as thermal shock resistance. Mean grain size can be determined by various methods as follows. Cut surface of the silicon nitride sintered material may be polished to mirror finish and photographed under SEM (scanning electron microscope) so as to measure the lengths of silicon nitride crystal grains in the SEM picture. Or an X-ray micro analyzer may be used to identify silicon nitride crystal grains and measure the lengths of the crystal grains. Alternatively, grain boundary layers may be removed from mirror-polished surface of the silicon nitride sintered material by thermal etching or chemical etching, so as to measure the lengths of the crystal grains. With any of these methods, the mean grain size is calculated by averaging the measured lengths of a plurality of grains.

In the present invention, the grain boundary layer refers to a region surrounded by silicon nitride crystal grains. In the grain boundary layer, the first through third metal silicides may exist either individually or as a neighboring phase. According to the present invention, while it is necessary that the first through third metal silicides exist as neighboring phases in the grain boundary layer, but may not necessarily exist as neighboring phases in every grain boundary layer.

The neighboring phase may be formed such that at least some of the first through third metal silicides adjoin each other. It is more preferable that at least two of the first through third metal silicides are disposed so that one of the two surrounds a part or whole of the other. The constitution will be described in detail below with reference to FIG. 1.

Figure 1:
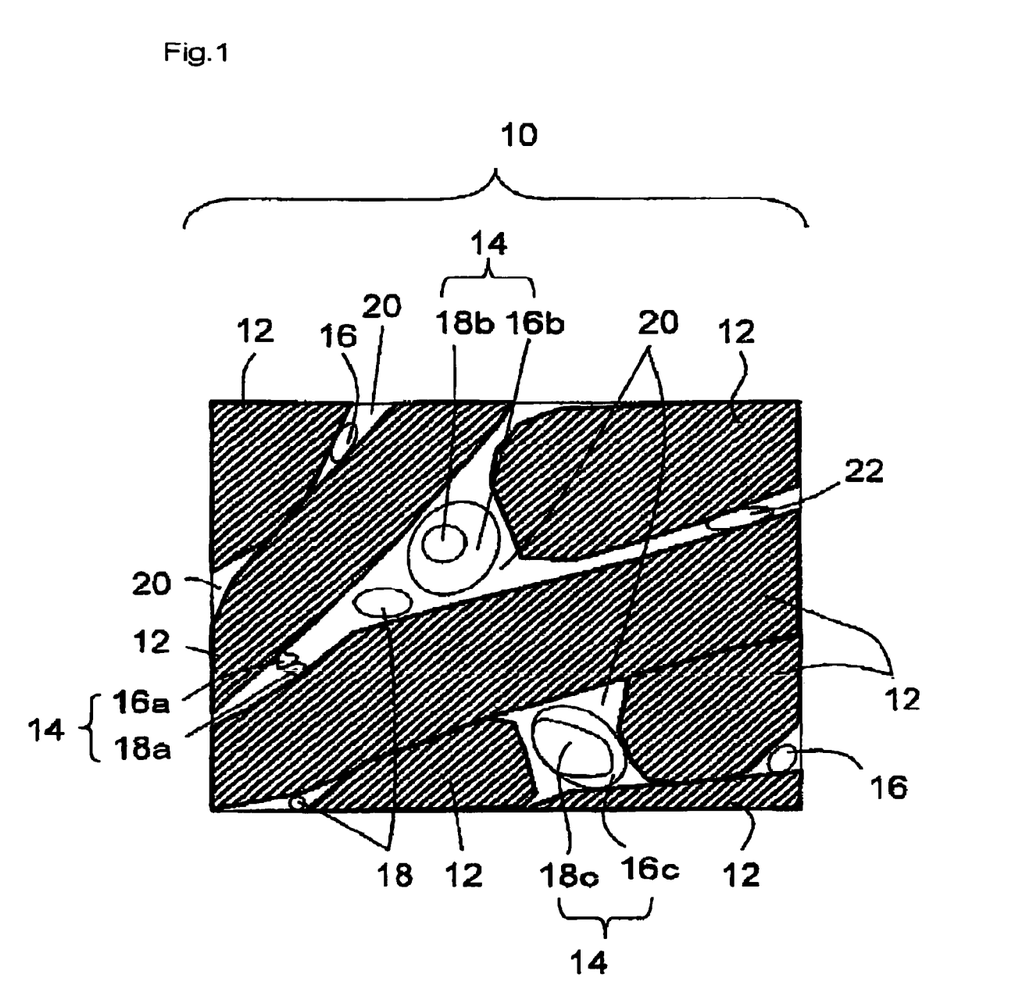
FIG. 1 is a schematic diagram based on SEM image of silicon nitride sintered material of the present invention.

FIG. 1 shows an example of cut surface 10 of the silicon nitride sintered material according to the present invention, in a schematic diagram based on SEM image of the silicon nitride sintered material on the cut surface 10 polished to mirror finish and photographed under SEM (scanning electron microscope). The cut surface 10 of the silicon nitride sintered material polished to mirror finish has grain boundary layer 20 located between crystal grains 12 of silicon nitride. Contained in the grain boundary layer 20 are first metal silicide 16, second metal silicide 18 and third metal silicide 22, that form various neighboring phases 14. The neighboring phases 14 contain one in which the first metal silicide 16a and the second metal silicide 18a are located adjacent to each other, one in which the first metal silicide 16b surrounds the second metal silicide 18b, and one in which the first metal silicide 16c surrounds the second metal silicide 18c but the second metal silicide 18c is partially exposed.

According to the present invention, since the first through third metal silicides form the neighboring phases within the boundary layer, thermal shock resistance and mechanical strength of the silicon nitride sintered material can be improved. Mechanism of this improvement is supposedly as follows. When the first through third metal silicides form the neighboring phases within the boundary layer, mechanical stress and thermal stress are suppressed from concentrating in the metal silicide more than in the case where the metal silicides are dispersed. This makes it possible to improve the thermal shock resistance and mechanical strength of the silicon nitride sintered material. That is, the first through third metal suicides that form the neighboring phase occupy a higher proportion of the grain boundary layer, and are therefore more susceptible to concentration of mechanical stress and thermal stress. As a result, the first through third metal silicides that are dispersed are less susceptible to mechanical stress and thermal stress. Also because the metal silicides of the first through third metal silicides have high values of Young's modulus and less variation in thermal expansion coefficient with temperature than silicon nitride has, the neighboring phase is presumed to promote the elastic deformation of the silicon nitride crystal grains against the mechanical and thermal stresses. Thus it is made possible to prevent cracks in the silicon nitride crystal from developing by means of the neighboring phase even when microscopic cracks are generated in the sintered material, or to suppress the occurrence of cracks in the silicon nitride sintered material. In case the first through third metal silicides are dispersed as in the prior art instead of forming neighboring phase, mechanical stress and thermal stress concentrate in the individual metal silicides. This turns the first through third metal silicides into start points of fracture or accelerates the growth of cracks, thus resulting in cracks of the silicon nitride sintered material.

It is preferable that the first metal element is Fe and the second metal element is W. This is because the Fe silicide, among the first metal silicides constituted from the first metal element, and W silicide, among the second metal silicides constituted from the second metal element, have similar crystal structures and therefore can easily form neighboring phase with each other. As a result, the neighboring phase occupies a higher proportion of the grain boundary layer, and improves the mechanical characteristics and thermal characteristics, especially thermal shock resistance and mechanical strength.

The first metal silicide is preferably at least one selected from among $FeSi_2$, $FeSi$, $Fe_3Si$, $Fe_5Si_3$, $Cr_3Si_2$, $MnSi$ and $Cu_2Si$. The second metal silicide is preferably at least one selected from among $WSi_2$, $W_5Si_3$, $WSi_3$, $W_2Si_3$ and $MoSi_2$. The third metal silicide preferably consists of a plurality of metal components (compound) containing Fe and W, for example a solid solution of F and W. These metal silicides are preferably used because they are thermodynamically stable phases. Thermodynamically stable phases are less likely to undergo phase transformation even when subjected to mechanical stress and thermal stress, and are therefore not subjected to further increases in mechanical stress and thermal stress that accompany the phase transformation.

Fe silicide as the first metal silicide is preferably at least one of $FeSi$ and $FeSi_2$, and more preferably $FeSi_2$. W silicide as the second metal silicide preferably contains $WSi_2$.

The most preferably used combination is $FeSi_2$ as the first metal silicide and $WSi_2$ as the second metal silicide. This is because $WSi_2$ and $FeSi_2$ are phases that remain stable when the ambient temperature changes, and these silicides have very similar crystal structures. As a result, it is easy to form neighboring phase among W silicides, and neighboring phase containing $FeSi_2$ can be uniformly dispersed in the silicon nitride sintered material. Therefore, mechanical characteristics and thermal characteristics of the silicon nitride sintered material can be improved further, by containing $FeSi_2$ as the first metal silicide and $WSi_2$ as the second metal silicide.

It is preferable that the neighboring phase has mean grain size of 30 μm or less, particularly from 1 to 5 μm. When the mean grain size is larger than 30 μm, the neighboring phase is not able to mitigate mechanical stress and thermal stress sufficiently, thus making it impossible to greatly improve thermal shock resistance and mechanical strength. In this case, mean grain size of the neighboring phase can be determined by averaging the sizes of a plurality of neighboring phases in magnified observation of the sintered body with a scanning electron microscope (SEM) or the like, similarly to the determination of mean grain size of the silicon nitride crystal described above.

Content of the neighboring phase is preferably in a range from 0.01 to 10% by volume in order to improve the thermal shock resistance and mechanical strength, more preferably from 0.1 to 5% by volume and most preferably from 0.1 to 1% by volume.

Presence of the first through third metal silicides and the neighboring phase is determined and content of the neighboring phase is measured as follows. Existence of the first metal silicide 16, the second metal silicide 18, third metal silicide 22 and the neighboring phase 14 shown in FIG. 1 is determined by means of X-ray diffraction analysis, microprobe X-ray diffraction method, X-ray micro analyzer (for example, wavelength dispersion type EPMA (electron probe micro analyzer)), TEM (transmission electron microscope) or the like. When X-ray diffraction analysis is employed, it is preferable to use an X-ray micro analyzer or a TEM as well in the measurement. A sample to be analyzed with a TEM is processed into a thin test piece before measurement.

Content of the neighboring phase 14 is measured, for example, as follows. Cut surface of the sintered body is polished to mirror finish. A portion measuring about 500 μm by 500 μm of the mirror surface (area of this portion will be referred to as area A) is irradiated with electron beam by means of an X-ray micro analyzer so as to identify the kind of characteristic X-ray emitted by the sintered material and measure the intensity thereof, and the intensity of each of Si, first and second metal elements (Fe, Cr, Mn, Cu, W and Mo) is mapped. Then (1) area of first portion (second metal silicide 18) that contains Si and is rich in at least one of the second elements, (2) area of second portion (first metal silicide 16) that contains Si and is rich in at least one of the first elements, and (3) area of a portion (third metal silicide 22) that contains Si, the first and second elements are determined. Then area B of a portion where at least two of the first through third portions of (1) through (3) adjoin each other is measured. Ratio of the area B to the area A that is the area of the measured region is calculated and is taken as the proportion (% by volume) of the neighboring phase 14. For the measurement of area A, magnifying factor may be changed to the extent that the mechanical characteristics such as mechanical strength and thermal characteristics such as thermal shock resistance and the neighboring phase 14 can be distinguished. It is preferable to identify the crystal phase included in the neighboring phase 14 by employing X-ray micro analyzer and TEM in combination.

Preferred embodiments of the silicon nitride sintered material according to the present invention will now be described.

In a preferred embodiment (first embodiment) of the silicon nitride sintered material, neighboring phase is formed where the first metal silicide surrounds the second metal silicide or the third metal silicide. Since the first metal silicide has higher fracture toughness than the second metal silicide and the third metal silicide have, this constitution makes it possible to suppress cracks occurring in the silicon nitride sintered material under a large mechanical stress and improve the mechanical characteristics.

In order to further improve the mechanical characteristics, for example mechanical strength, it is preferable that mean grain size of the silicon nitride crystal is 15 μm or less. This is because silicon nitride crystal having a mean grain size exceeding 15 μm leads to lower fracture toughness and lower mechanical strength. The mean grain size in this case means the mean length of the acicular crystal grains, as described previously. When the mean grain size is 15 μm or less in length and 2 μm or less in thickness, grain boundary layers can be prevented from being concentrated locally so that the neighboring phase can be distributed uniformly in the sintered material.

When the contents of the metal silicides are differentiated, such a structure can be obtained as neighboring phase where the first metal silicide surrounds the second metal silicide or the third metal silicide, thereby improving the mechanical characteristics. For example, such proportions may be employed as the total content of the first metal element is in a range from 0.2 to 10% by weight and the total content of the second metal element is in a range from 0.1 to 3% by weight, while the proportion of the first metal element is higher than the proportion of the second metal element. The first and second metal elements may be introduced as impurities in the manufacturing process, apart from the stock materials of the silicon nitride sintered material. However, the first through third metal silicides contained in the sintered material, even when introduced as impurities, mostly form metal silicides that are contained in the silicon nitride sintered material. Therefore, entry of the impurities is not a problem as long as the resultant contents of the metal elements in the silicon nitride sintered material are in the ranges of the present invention described above.

When the silicon nitride crystal has mean grain size of 15 μm or less, proportion of neighboring phase of the first metal silicide and the second metal silicide/third metal silicide can be increased, and the neighboring phase can be distributed in the grain boundary layers, thereby improving the mechanical characteristics further.

Proportion of neighboring phase can be increased and the neighboring phase can be distributed in the grain boundary layers also by molding and firing a mixture of a Si powder or a mixture of Si powder and a silicon nitride powder, a powder comprising a compound of the first metal element having a mean grain size in a range from 0.5 to 20 μm or less and a powder comprising compound of the second metal element having a mean grain size in a range from 0.1 to 5 μm or less. This enables it to further improve the mechanical characteristics. Also the mean grain size of silicon nitride crystal may be controlled to 15 μm or less at the same time.

Now another preferred embodiment (second embodiment) of the silicon nitride sintered material will be described.

In this embodiment, constitution of the neighboring phase is reverse to that described above, namely the second metal silicide surrounds the first metal silicide or the third metal silicide. The second metal silicide has smaller thermal expansion coefficient that those of the first metal silicide and the third metal silicide. As a result, it is supposed that thermal stress generated by thermal expansion of the first metal silicide or the third metal silicide is mitigated by the second metal silicide, thereby to further improve the thermal shock resistance.

When the contents of the first through third metal silicides are differentiated, such a structure can be obtained as the second metal silicide surrounds the first metal silicide or the third metal silicide, thereby to obtain the silicon nitride sintered material having improved thermal shock resistance. For example, such proportions may be employed as the total content of the first metal element is in a range from 0.01 to 2% by weight and the total content of the second metal element is in a range from 1 to 10% by weight, while the proportion of the second metal element is higher than the proportion of the first metal element. The first and second metal elements may be introduced either as the stock material or as impurities mixing in the manufacturing process. In this case, too, entry of the impurities is not a problem as long as the resultant contents of the metal elements in the silicon nitride sintered material are in the ranges of the present invention described above.

The silicon nitride sintered material is preferably made by molding and firing a mixture of a Si powder or a mixture of a Si powder and silicon nitride powder, a powder of compound of the first metal element having a mean grain size in a range from 0.1 to 5 μm and a powder of a compound of the second metal element having a mean grain size in a range from 1 to 30 μm, so that proportion of neighboring phase can be increased, and the neighboring phase can be distributed in the grain boundary layers. As a result, the silicon nitride sintered material having improved thermal shock resistance can be obtained.

In addition to the features of the silicon nitride sintered material described above, it is further preferable that the grain boundary layer contains amorphous phase that comprises group III element of the periodic table (RE), Al and O in the grain boundary layer. Inclusion of the amorphous phase allows for liquid phase to form at a low temperature during firing, thus forming fine silicon nitride crystal grains of uniform size. As a result, the silicon nitride sintered material that is excellent in thermal shock resistance and mechanical strength can be obtained. The amorphous phase may be formed in the sintered material, for example, by molding and firing the mixture after adding oxide of group III element of the periodic table and an aluminum oxide powder, as will be described later. In order to form fine silicon nitride crystal grains of uniform size throughout the sintered material by dispersing the amorphous phase uniformly in the grain boundary layers, it is preferable to set the rate of lowering temperature during the firing process from the maximum temperature to 800° C. to 100° C. per hour or higher. The silicon nitride sintered material of the present invention preferably contains RE in a proportion of 1 to 20% by weight in terms of $RE_2O_3$, and Al in a proportion of 0.1 to 10% by weight in terms of $Al_2O_3$. The third metal element refers to at least one element selected from among Sc, Y, lanthanides and actinides.

It is preferable to use at least one kind of Y, Er, Yb and Lu as the main component of RE, in order to improve the mechanical strength at high temperatures. This also leads to improvement in oxidation resistance in high temperature oxidizing atmosphere. In case RE is Y, evaporation of RE can be suppressed more than in the case where RE is not Y. This makes it possible to control the composition of the silicon nitride sintered material with higher accuracy, thereby to reduce the variation in the mechanical characteristics.

It is preferable that the grain boundary layer contains at least one kind of apatite phase, Wollastonite phase and di-silicate phase. This enables it to further improve the mechanical strength of the silicon nitride sintered material. The apatite phase is a compound represented by $RE_5(Si_4)_3N$, Wollastonite phase is a compound represented by $RESiO_2N$, and di-silicate phase is a compound represented by $RE_2Si_2O_7$. When the grain boundary layer contains apatite phase or Wollastonite phase, mechanical strength at high temperatures, high temperature creep resistance and thermal shock resistance can be improved. In case the grain boundary layer contains di-silicate phase, oxidation resistance at high temperatures can be improved.

Ratio of Si to RE contents in the grain boundary layer is preferably in a range from 0.2 to 10 in equivalent molar ratio of $SiO_2/RE_2O_3$. This enables it to further improve the mechanical strength of the silicon nitride sintered material. It is further preferable that molar ratio $SiO_2/RE_2O_3$ is from 0.2 to 4 in order to improve the sintering property of the silicon nitride sintered material. The molar ratio can be determined as follows. Total oxygen content (% by weight) contained in $RE_2O_3$ and $Al_2O_3$ converted to percentage by volume by the method described above is denoted as G (% by weight). Total oxygen content in the silicon nitride sintered material is measured with an oxygen analyzer manufactured by LECO Inc., G (% by weight) is subtracted from total oxygen content (% by weight), and the remainder is converted to $SiO_2$ content (% by weight). Ratio of $SiO_2$ content (% by weight) to RE content (% by weight) in terms of $RE_2O_3$ is taken as the ratio of Si to RE in molar ratio of $SiO_2/RE_2O_3$.

Ratio of Al to RE contents in the grain boundary layer is preferably in a range from 0.2 to 5 in molar ratio of $Al_2O_3/RE_2O_3$. This enables it to further improve sintering property and improve fracture toughness of the silicon nitride sintered material. It is further preferable that molar ratio $Al_2O_3/RE_2O_3$ is in a range from 0.4 to 3. Molar ratio of Al to RE can be determined by ICP emission spectroscopy as follows.

Contents of Al and RE (% by weight) in the silicon nitride sintered material are measured by ICP emission spectroscopy, and are converted to contents (% by weight) in terms of $RE_2O_3$ and $Al_2O_3$. Then using the contents of $RE_2O_3$ and $Al_2O_3$ in terms of weight proportion and theoretical density (for example, 5.02 g/cm$^3$ for $RE_2O_3$ and 3.98 g/cm$^3$ for $Al_2O_3$), contents of $RE_2O_3$ and $Al_2O_3$ in volume proportion are determined.

The contents in the grain boundary layer described above are preferably less than 20% by volume. When the contents in the grain boundary layer are 20% by volume or higher, it is difficult to form the silicon nitride sintered material with high dimensional accuracy since it is susceptible to deformation during firing. When the proportion of the grain boundary layers is higher than 15% by weight and less than 20% by weight, it is impossible to significantly decrease deformation. When the proportion of the grain boundary layers is less than 5% by weight, it requires to fire at higher temperatures in order to obtain dense silicon nitride sintered material, but firing at a high temperature causes part of the silicon nitride crystal to grow into coarse grains thus making it impossible to significantly improve the mechanical strength and wear resistance. Accordingly, the proportion of the grain boundary layers is preferably in a range from 5% to 15% by weight.

Thus the silicon nitride sintered material of the present invention has relative density of 97% or higher, mean void size of 30 μm or less, fracture toughness of 5 MPa·m$^{1/2}$ or higher, compressive strength of 2 GPa or higher, bending strength of 650 MPa or higher at the room temperature, bending strength of 500 MPa or higher at 1000° C., strain of 2% or less after being loaded with 200 MPa at 1000° C. for 10 hours, thermal conductivity of 20 W/mK or higher and linear thermal expansion coefficient of $3.5 \times 10^{-6}$/K or less in temperature range from the room temperature to several hundreds of degrees Celsius. This makes the silicon nitride sintered material of the present invention that can be preferably used in applications requiring mechanical characteristics (mechanical strength, wear resistance and mechanical impact resistance) and thermal characteristics such as thermal shock resistance. The silicon nitride sintered material of the present invention can be used in such applications as follows.

The silicon nitride sintered material of the present invention that can be used to make a molten-metal-resistant member according to the first embodiment. The molten-metal-resistant member is excellent not only in mechanical characteristic but also in thermal shock resistance, and can therefore be used as a member that is required to have high thermal shock resistance, for example molten metal member. When used as the molten metal member, it remains resistant against cracks when subjected to thermal shock. Also because the neighboring phase is firmly bound with the silicon nitride crystal, metal silicide contained in the neighboring phase can be suppressed from being released as an impurity and mix into molten metal, thus enabling it to make high quality casting of the metal that contains less impurity.

The silicon nitride sintered material of the present invention that can be used to make a wear resistant member according to the second embodiment. The wear resistant member is excellent not only in thermal shock resistance but also in mechanical characteristics (mechanical strength, fracture toughness and wear resistance), and can therefore be preferably used as a wear resistant member that is required to have high thermal shock resistance and high mechanical strength. The silicon nitride sintered material can be preferably used to make members of crushing machine such as gravel crushing vanes or cutting tool tip. The wear resistant member made of the silicon nitride sintered material of the present invention can have even higher wear resistance when the void ratio is controlled to 3% or less.

The silicon nitride sintered material of the present invention has the silicon nitride crystal of high fracture toughness as the main component, contains the neighboring phase that has the action of relaxing mechanical stress in the grain boundary layers and is densely sintered. Consequently, the silicon nitride sintered material is substantially free from voids and fine defects, and can have crushing strength of 2 GPa or higher. Therefore, the silicon nitride sintered material can be used as a protecting member or a shock absorber for a living body or an object against collision of flying object of inorganic material such as metal.

The silicon nitride sintered material of the present invention contains the silicon nitride crystal and neighboring phase of small grain size and does not contain such compounds that significantly hamper the sintering process. As a result, the silicon nitride sintered material has small mean void size, high relative density and low linear thermal expansion coefficient of about $2\times10^{-6}$/K at a temperature from 20 to 30° C., thus making it preferably applicable to a member of a positioning table that requires high positional accuracy, particularly for a member of a positioning table for semiconductor manufacturing apparatus that requires especially high positional accuracy control. Possible applications also contain a mirror of an exposure system for semiconductor or liquid crystal manufacturing apparatus.

The method for manufacturing a silicon nitride sintered material according to the present invention will now be described. The method for manufacturing the silicon nitride sintered material comprises a material preparation process wherein a preliminarily mixed powder, that has been made by mixing the compound of the first metal element that is at least one of Fe, Cr, Mn and Cu having a mean grain size in a range from 0.1 to 20 μm and the compound of the second metal element that is at least one of W and Mo having a mean grain size in a range from 0.1 to 30 μm in a wet mixing process and drying, is mixed with a Si powder or a mixture of a Si powder and a silicon nitride powder thereby to prepare the material powder; a molding process where a compact constituted from the material powder and an organic binder is formed; a degreasing process where the organic binder is removed from the compact in an atmosphere substantially consisting of nitrogen gas, argon gas or a mixed gas thereof; a nitriding process where the degreased compact is transformed into a nitrided material in a substantially nitrogen gas atmosphere; and a firing process wherein the nitrided material is fired in a non-oxidizing atmosphere that contains nitrogen gas.

According to this manufacturing method, the neighboring phase is contained in the grain boundary layers of the silicon nitride sintered material of the present invention in the following process.

In the wet mixing process described above, compounds of the first and second metal elements are dispersed uniformly in the preliminarily mixed powder, and grains formed from the compounds of the first and second metal elements are dried so as to bond with each other and for the preliminarily mixed powder. As a result, the preliminarily mixed powder contains the first and second metal elements dispersed uniformly therein with the grains firmly bonded with each other. In order to achieve the uniform dispersion and firm bonding, at least one selected from among water, isopropyl alcohol, ethanol and methanol is preferably used as the solvent during the wet mixing process. It is preferable to contain water in the solvent, since this enables the grains of the first and second metal to firmly bond with each other during the drying process.

Then the preliminarily mixed powder is mixed with a Si powder or a mixture of a Si powder and a silicon nitride powder, so as to prepare the material powder wherein the grains of the first and second metal firmly bond with each other and the preliminarily mixed powder is dispersed uniformly in the powder mixture.

In the nitriding process, the compound of the first metal element, the compound of the second metal element and the compound of the first and second metal elements react with Si so as to form a first metal silicide precursor, a second metal silicide precursor and a third metal silicide precursor, and a neighboring phase precursor is formed where at least two of the precursors are disposed in contact with each other. The first through third metal silicide precursors and the neighboring phase precursor refer to a material that is amorphous or is not partially crystallized. The neighboring phase precursor is formed in the nitriding process, because the material powder contains the grains formed from the compound of the first metal element and the grains formed from the compound of the second metal element that are bonded with each other, and are nitrided while being bonded with each other. A Si powder is added to the material powder, for the purpose of accelerating the reaction of the first and second metal elements and Si so as to form the neighboring phase precursor. When the material powder does not contain a Si powder, the reaction of the first and second metal elements and Si is not accelerated and therefore nitride material that contains the neighboring phase precursor cannot be formed.

The neighboring phase precursor contained in the nitride material is crystallized in the firing process and is turned into neighboring phase. Even when the contents of the first and second metal elements in the sintered material are the same, content of the neighboring phase can be controlled by controlling the temperature and the holding time of the nitriding process.

According to the method for manufacturing a silicon nitride sintered material of the present invention, the neighboring phase that contains the third metal silicide can be formed without using the compound that does not contain both of the first and second metal elements in the preliminarily mixed powder. The mechanism by which the neighboring phase is formed is presumably as follows. When the grains formed from the compound of the second metal element are nitrided while being disposed adjacent to each other, neighboring phase precursor is formed wherein a solid solution of one of the first metal silicide precursor and the second metal silicide precursor into the other and either of the first or second metal silicide precursor are disposed adjacent to each other. The neighboring phase precursor is turned into neighboring phase where the third metal silicide is disposed adjacent to the first or second metal silicide.

According to the manufacturing method of the present invention, the powder having a mean grain size in a range from 0.1 to 20 μm formed from the compound of the first metal element and the powder having a mean grain size in a range from 0.1 to 30 μm or less formed from the compound of the second metal element are used. Use of the powders having grain sizes in these ranges is supposed to accelerate the formation of the neighboring phase precursor in the nitriding process, thereby increasing the proportion of those among the first through third metal silicides that contribute to the formation of the neighboring phase. This proportion can be increased by mixing the powders more uniformly in the powder mixing process described above.

It is preferable that specific surface area of the preliminarily mixed powder is in a range from 3 to 30 m$^2$/g. This accelerates the nitriding process and increases the proportion of at least two of the first through third metal silicides that contribute to the formation of the neighboring phase.

When both the Si powder and the silicon nitride powder are used as the starting materials, the proportion of the Si powder, the weight of Si powder/total weight of Si powder and a silicon nitride powder is preferably in a range from 0.4 to 0.95. When this ratio is less than 0.4, it may become difficult to form the first through third metal silicides and the neighboring phase precursor, and it becomes impossible to control the dimensional accuracy of the silicon nitride sintered material with high precision. When the ratio is higher than 0.95, it takes a long period of nitriding and greater manufacturing cost to nitride a degreased body having large thickness.

The purpose of making the compact constituted from the mixed powder and organic binder is to increase the density of the compact and decrease the variability in the density of the compact. This causes the sintering process to proceed uniformly throughout the material being fired, so that thermal shock resistance and mechanical strength of the silicon nitride sintered material can be improved.

The purpose of removing the organic binder is removed from the compact in an atmosphere substantially consisting of nitrogen gas, argon gas or a mixed gas thereof is to decrease carbon content so as to improve the sintering property. The degreasing process is carried out by setting the compact in a furnace.

The degreasing process is carried out preferably in an atmosphere substantially consisting of nitrogen gas. It is not desirable to degrease in an atmosphere that contains expensive gas such as helium or hydrogen, since it leads to a high manufacturing cost. The degreasing process is carried out preferably at a temperature not higher than 1000° C., more preferably in a range from 500 to 900° C.

The reason why the degreasing process is carried out in the atmosphere substantially consisting of nitrogen gas is that a nitriding atmosphere that contains 1% or more hydrogen or helium leads to problems as follows. First, an expensive gas such as helium or hydrogen leads to a high manufacturing cost. Second, in case a plurality of the compacts are placed in a batch-operation furnace and there is deviation in the positions of the compacts in the furnace, there occur significant variations among the compacts in the rate of nitriding reaction of the compacts, thus making it very difficult to nitride the plurality of compacts simultaneously. The nitriding process is carried out by setting the degreased compact in a furnace. In order to nitride the degreased compact in an atmosphere substantially consisting of nitrogen gas, it is preferable that oxygen gas concentration in the nitrogen gas that is charged into the furnace is 0.5% or less.

The nitriding process of the compact that contains a Si powder begins with the nitriding of the Si powder located on the surface of the compact and proceeds with time to the Si powder located inside of the compact. Therefore, there arises such a state that there is more Si inside of the compact than on the surface at a time in the course of first nitriding process or at the end thereof. In order to proceed from this state to complete nitriding of the compact, it is necessary to carry out nitriding at a high temperature (second nitriding) after nitriding at a low temperature (first nitriding).

By controlling the temperature of the second nitriding, it becomes possible to control the content of the neighboring phase. That is, 0.1 to 5% by volume of neighboring phase can be contained in the silicon nitride sintered material by controlling the temperature of the second nitriding to 1200° C. or higher and lower than 1400° C. When the temperature of the second nitriding is 1100° C. or higher and lower than 1200° C. or from 1400 to 1500° C., only less than 0.1% by volume of neighboring phase can be contained, thus making it impossible to manufacture the silicon nitride sintered material that has excellent mechanical characteristics.

In nitriding process, it is preferable to control the exothermic reaction of nitriding and cause uniform sintering process to proceed thereafter, through the first nitriding process where 10 to 70% by weight of the Si powder in the compact is turned into silicon nitride at a temperature from 1000° C. to 1200° C. and 70% or more of the total silicon nitride in the degreased compact is turned into α phase, and the second nitriding process where rest of the Si powder in the degreased compact is turned into silicon nitride at a temperature from 1100° C. to 1500° C. and 60% or more of the total silicon nitride in the nitrided compact is turned into α phase. Temperature of the second nitriding process is set higher than that of the first nitriding process. It is more economical and preferable to carry out the first nitriding process and the second nitriding process consecutively. The nitrided material made through the first and second nitriding processes 60% or more thereof turned into α phase both on the surface and inside, and therefore mechanical strength of the silicon nitride sintered material can be improved. When the proportion of a portion that is turned into α phase is less than 60% of the nitrided material, density of the silicon nitride sintered material cannot be increased and it becomes difficult to increase the mechanical strength of the silicon nitride sintered material. Proportion of a portion that is turned into a phase after completing the nitriding process is preferably 80% or more of the nitrided material.

Since the nitriding process is carried out under a partial nitrogen pressure as low as 50 to 200 kPa, the silicon nitride sintered material can be manufactured at far lower cost than in the case of silicon nitride sintered material manufactured by a method of higher manufacturing cost such as firing at a high pressure gas or HIP sintering. It is preferable to carry out firing of the nitrided material described above consecutively following the nitriding in the same furnace.

In order to improve mechanical characteristics by densifying the silicon nitride sintered material, it is preferable that maximum temperature in the firing process is 1600° C. or higher. By firing at 1600° C. or higher, it is made possible to manufacture dense silicon nitride sintered material having relative density of 97% or higher and improve mechanical characteristics. In order to suppress the mechanical strength from lowering by suppressing the crystal grains of silicon nitride from growing excessively, it is preferable to set the upper limit of the firing temperature at 1850° C.

Then in order to form neighboring phase where the first metal silicide surrounds the second metal silicide or the third metal silicide in the silicon nitride sintered material described in the first embodiment, amounts of the compound of the first metal element and the compound of the second metal element added in the powder mixing process is controlled so that the content of the first metal element becomes higher than the content of the second metal element and the total content of the first metal element is from 0.2 to 10% by weight and the total content of the second metal element is from 0.1 to 3% by weight of the sintered material.

With this manufacturing method, neighboring phase where the first metal silicide precursor surrounds the second metal silicide precursor or the third metal silicide precursor is formed in the nitriding process. In case the first and/or second metal element mixes as impurity in the manufacturing process, contents of the first and second metal element may be controlled by removing the impurity. Specifically, for example, in case Fe component mixes into the material powder due to wear of the machine used in the powder mixing process, the Fe component may be removed by attracting by magnetic field applied to the powder after the powder mixing process, thereby to control the Fe content included in the silicon nitride sintered material in the final stage.

When the powder of compound of the first metal element has mean grain size in a range from 1 to 20 µm and the powder of compound of the second metal element has mean grain size in a range from 0.1 to 5 µm, proportion of the surrounding first metal silicide can be increased, and therefore the silicon nitride sintered material having further improved mechanical characteristics can be manufactured.

The silicon nitride sintered material having the mechanical strength further improved can be manufactured by increasing the content of the neighboring phase that is formed so that the first metal silicide surrounds the second metal silicide or the third metal silicide. For that purpose, temperature lowering rate in the firing process is preferably set to 50° C. per hour or higher.

The mechanism whereby the content of the neighboring phase can be increased further by setting the temperature lowering rate to 50° C. per hour or higher is supposedly as follows. In the firing process, liquid phase that contains the first metal element, the second metal element and silicon is formed in the grain boundary layer at a high temperature. The liquid phase contains fine grains of the second metal silicide or the third metal silicide. Then as the temperature is lowered at a rate of 50° C. per hour or higher, it is presumed that the first metal silicide precipitates at positions adjacent to the fine grains of the second metal silicide or the third metal silicide so that neighboring phase where the first metal silicide surrounds the second metal silicide or the third metal silicide increases. In case the temperature lowering rate is less than 50° C. per hour, it becomes more likely that the first metal silicide is separated from the second metal silicide and/or the third metal silicide when the temperature is lowered, thus making it impossible to manufacturing the silicon nitride sintered material of high content of the neighboring phase.

It is more preferable to set the rate of lowering the temperature from the maximum temperature to 1000° C. in the firing process to 50° C. per hour or higher. This is because the content of the neighboring phase, shape, crystal grain size, extent of crystallization and other properties established at temperatures of 1000° C. and higher hardly change at temperatures lower than 1000° C., and therefore the temperature lowering rate at temperatures below 1000° C. has virtually no influence on the thermal shock resistance and mechanical strength. In order to control the temperature lowering rate in the firing process to 50° C. per hour or higher, nitrogen gas or the like of normal temperature is preferably introduced into the furnace to assist cooling, in addition to the control of the firing temperature. While the fired object (degreased compact of silicon nitride being sintered) and the firing fixture whereon the fired object is placed may have different temperatures, the temperature lowering rate of the fired object can be controlled to 50° C. per hour or higher by controlling the temperature lowering rate of the firing fixture roughly to 100° C. per hour or higher.

It is further preferable to control the mean grain size of the Si powder used as the starting material within a range from 2 to 50 µm and specific surface area of the degreased material in a range from 2 to 30 m²/g, thereby to control the mean grain length of the silicon nitride sintered material to 15 µm or less. When the mean grain size of the Si powder is less than 2 µm, large amount of heat generated during rapid nitriding reaction of the Si powder may cause rapid temperature rise of the nitrided material, that may result in the growth of large grains of silicon nitride crystal. The abnormal growth of the silicon nitride crystal may result in mean grain size larger than 15 µm. Controlling the specific surface area of the degreased material within a range from 2 to 30 m²/g makes it possible to suppress the large amount of heat from being generated during rapid nitriding reaction of the Si powder and, even when large grains of silicon nitride crystal are formed in the nitriding process, suppress the grains of silicon nitride crystal from growing during firing, so that mean grain length of the silicon nitride sintered material can be controlled to 15 µm or less.

In order to form the neighboring phase where the second metal silicide surrounds the first metal silicide or the third metal silicide in the silicon nitride sintered material described in the second embodiment, quantities of the compounds of the first metal element and the compounds of the second metal element added in the powder mixing process are controlled so that the proportion of the second metal element becomes higher than the proportion of the first metal element, while the total content of the first metal element is in a range from 0.01 to 2% by weight and the total content of the second metal element is in a range from 1 to 10% by weight.

This manufacturing method enables it to form the neighboring phase precursor where the second metal silicide precursor surrounds the first metal silicide precursor or the third metal silicide precursor in the nitriding process. In case the first and/or second metal element mixes as impurity in the manufacturing process, contents of the first and second metal element may be controlled by removing the impurity.

Controlling the mean grain size of the powder formed from the compound of the first metal element in a range from 0.1 to 5 µm and the mean grain size of the powder consisting of the compounds of the second metal element in a range from 1 to 30 µm enables it to increase the content of the surrounding second metal silicide, so that the silicon nitride sintered material that has higher thermal shock resistance can be manufactured.

This is supposedly due to the mechanism described below. When the mean grain size of the powder consisting of the compounds of the second metal element is controlled within a range from 1 to 30 µm, large grains of the second metal silicide are formed due to the high temperature of the firing process and are dispersed in the grain boundary layers. When the mean grain size of the powder formed from the compound of the first metal element is controlled within a range from 0.1 to 5 µm, liquid phase or metal silicide that contains the first metal element or the first and second metal elements far smaller than the grains of the second metal silicide are formed in the grain boundary layers due to the high temperature of the firing process. Also because the first metal silicide or the third metal silicide are crystallized adjoining the large grains of the second metal silicide during cooling down after firing, content of the neighboring phase where the second metal silicide is formed so as to surround the first metal silicide or the third metal silicide increases.

The mean size of the grains consisting of the compounds of the first and second metal elements may be determined by measuring the sizes of individual grains on SEM photograph and averaging the measured sizes.

It is preferable to carry out the degreasing process, the nitriding process and the firing process consecutively in the same furnace, in order to reduce the cost of manufacturing the silicon nitride sintered material.

EXAMPLE 1

The powder (P1) consisting of the compounds of the first metal element and the powder (P2) consisting of the compounds of the second metal element were mixed in a wet process using water, and the resultant slurry was dried at 100° C. thereby to prepare the preliminarily mixed powder (P12). The preliminarily mixed powder (P12), silicon nitride ($Si_3N_4$) powder (mean grain size of 1 µm or less, 90% turned into a phase, Fe impurity content 500 ppm), a Si powder (mean grain size of 3 µm or less, Fe impurity content 800 ppm) and a powder of a sintering additive were measured and mixed according to the proportions shown in Table 1. Sum of the material powders and the sintering additive is assumed 100% by weight. Contents of the powder (P1) and the powder (P2) shown in Table 1 are given in terms of the first and second metal elements.

When $Fe_2O_3$ is used as the powder (P2), the content of the powder (P2) is given by converting the total content of $Fe_2O_3$ included in the Si powder and in the silicon nitride powder into the amount of Fe. A $Fe_2O_3$ powder is a powder of iron oxide. The mean particle sizes of the powder (P1) and the powder (P2) were determined by using SEM photographs of the powders.

Then the mixed powder, ethanol and a silicon nitride crushing medium were mixed in a barrel mill. Polyvinyl alcohol (PVA) was added as an organic binder to the slurry thus obtained and was mixed and dried with a spray drier so as to granulate. The granulated powder was molded with a pressure of 80 MPa by powder press molding method using a die, so as to make a plurality of compacts having disk shape measuring 60 mm in diameter and 30 mm in thickness.

The organic binder (PVA) contained in the compacts was removed by keeping the compacts in the degreasing atmosphere specified in Table 2 at 600° C. for 3 hours.

The degreased compacts were placed in a mortar made of carbon lined with silicon nitride on the surface, and were heated in an atmosphere consisting substantially of nitrogen with partial pressure shown in Table 2 in steps of 1100° C. for 20 hours, 1200° C. for 10 hours and 1260° C. for 5 hours (temperature was raised at a rate of 50° C. per hour between the successive steps), thereby to nitride Si into $Si_3N_4$ with 90% or more being turned into a phase. Then the temperature was raised further to 1770° C. and kept at this temperature for 10 hours in an atmosphere with the same partial pressure of nitrogen as that of the nitriding process, thereby to make samples of the present invention constituted from type β silicon nitride sintered material.

Test pieces specified in JIS R1601 were cut out of the sintered material thus obtained. The test pieces were subjected to 4-point bending test to determine bending strength (average of 7 pieces). Fracture toughness was measured by SEPB (single edge pre-cracked beam) method.

Cut surface of the sintered body was polished to mirror finish. A portion measuring 500 µm by 500 µm of the surface (area A1) was observed with an X-ray micro analyzer (JXA-8600M manufactured by JEOL, Ltd.) so as to determine whether a metal silicide of W and/or Mo is formed adjacent to metal silicide of at least one of Fe silicide, Cr silicide, Mn silicide and Cu silicide. All test pieces showed the existence of neighboring phase formed therein. Then it was determined which of neighboring phases A through C was included with the highest proportion. The neighboring phase constituted from the first metal silicide and the second metal silicide is referred to as neighboring phase A, neighboring phase constituted from the first metal silicide and the third metal silicide is referred to as neighboring phase B, neighboring phase that surrounds the second metal silicide and the first metal silicide is referred to as neighboring phase C. The neighboring phase included with the highest proportion in each test piece is shown in Table 1. Crystal structure of the neighboring phase was investigated with TEM, microprobe X-ray diffraction method and X-ray micro analyzer.

Content (% by volume) of the neighboring phase in the sintered material was measured as follows. Cut surface of the sintered body was polished to mirror finish and was observed in the area A1 by magnifying 3000 times with an X-ray micro analyzer (JXA-8600M manufactured by JEOL, Ltd.). Intensities of emission from Si, W, Fe, Cr, Mn, Cu and Mo were displayed in colors, so as to identify the first portion where Si is contained and the concentration of at least one of Fe, Cr and Mn is higher than in any other portions of the observed area, and the second portion where Si is contained and concentration of at least one of W and Mo is higher than in any other portions of the observed area. Then area B1 of a neighboring phase where the second portion adjoins the first portion was measured and the proportion of the area B1 to the area A1 described previously was calculated and taken as the content (% by volume) of the neighboring phase 14.

Thermal shock test was conducted where the test piece was heated to 650° C. with a heater block and was put into water of 25° C., to determine whether cracks occurred.

As the test results are shown in Table 2, neighboring phase was observed in test pieces Nos. 1 through 15 of the present invention which showed high strength and high fracture toughness, with no crack in thermal shock test. Inclusion of 0.1 to 5% by volume of neighboring phase was observed.

In case the neighboring phase included the first metal silicide, the first metal silicide contained at least one among $FeSi_2$, FeSi, $Fe_3Si$, $Fe_5Si_3$, $Cr_3Si_2$, MnSi and $Cu_2Si$. In case the neighboring phase included the second metal silicide, the second metal silicide contained at least one among $WSi_2$, $W_5Si_3$, $WSi_3$, $W_2Si_3$ and $MoSi_2$. Samples Nos. 1 through 10 had neighboring phase formed so that the first metal silicide surrounded the second metal silicide or the third metal silicide. Samples Nos. 11 through 15 had neighboring phase formed so that the second metal silicide surrounded the first metal silicide or the third metal silicide.

Sample No. 13 that did not contain RE in the sintering additive and sample No. 8 that did not contain Al in the sintering additive were within the scope of the present invention, but did not show significant improvement in strength and fracture toughness.

As comparative examples of silicon nitride sintered material, samples Nos. 16 through 23 were made and evaluated similarly to Example. Samples of the comparative example were made similarly to Example, except for the following conditions. Samples of the comparative example were sample No. 16 made by mixing the powder (P1), the powder (P2), the Si powder and silicon nitride powder without preliminary mixing, sample No. 17 made without the powder (P2), sample No. 18 made by using $Fe_2O_3$ powder of which mean particle size was 0.05 µm without preliminary mixing, sample No. 19 made by using $Fe_2O_3$ powder of which mean particle size was 28 µm, sample No. 20 made by using $WO_3$ powder of which mean grain size was 0.05 µm without preliminary mixing, sample No. 21 made by using $WO_3$ powder of which mean particle size was 43 µm or less, sample No. 22 made by firing by raising the temperature at a rate of 100° C. per hour up to the target temperature without nitriding process, and sample No. 23 made without using Si powder.

Samples of comparative example showed no neighboring phase formed therein with the first through third metal silicides existing almost independently from each other, thus resulting in low strength, low fracture toughness and occurrence of cracks in thermal shock test.

TABLE 1

| | | Material powder | | | | | |
|---|---|---|---|---|---|---|---|
| | | Powder P1 | | | Powder P2 | | |
| Sample No. | Preliminary mixing | Composition | Mean grain size (μm) | Content on element basis (% by weight) | Composition | Mean grain size (μm) | Content on element basis (% by weight) |
| 1 | Done | Fe₂O₃ | 0.6 | 0.2 | WO₃ | 0.1 | 0.1 |
| 2 | Done | Cr₂O₃ | 0.5 | 0.7 | WO₃ | 2.3 | 0.3 |
| 3 | Done | MnO₂ | 1.2 | 1.3 | WO₃ | 1 | 07 |
| 4 | Done | CuO | 3.6 | 2 | WO₃ | 2.5 | 1.3 |
| 5 | Done | Fe₂O₃ | 5.7 | 3 | MoO₃ | 5 | 2.7 |
| 6 | Done | Fe₂O₃ | 1.2 | 0.5 | WO₃ | 0.5 | 0.4 |
| | | MnO₂ | 3.4 | 0.5 | | | |
| 7 | Done | Fe₂O₃ | 0.8 | 0.5 | WC | 1 | 0.4 |
| 8 | Done | Fe₂O₃ | 8.2 | 10 | WO₃ | 2.4 | 0.5 |
| 9 | Done | Fe₂O₃ | 18.5 | 4.1 | WO₃ | 1.2 | 1 |
| 10 | Done | Fe₂O₃ | 0.9 | 1.6 | WO₃ | 0.9 | 1.2 |
| 11 | Done | Fe₂O₃ | 0.3 | 0.1 | WO₃ | 0.6 | 1 |
| 12 | Done | Fe₂O₃ | 0.8 | 0.3 | WO₃ | 1.3 | 0.6 |
| 13 | Done | Fe₂O₃ | 1.2 | 0.5 | WO₃ | 29.4 | 1.4 |
| 14 | Done | Fe₂O₃ | 3.5 | 0.7 | WO₃ | 10.6 | 8 |
| 15 | Done | Fe₂O₃ | 5 | 2 | WO₃ | 5.3 | 2.3 |
| *16 | No | Fe₂O₃ | 13 | 1.5 | WO₃ | 1.5 | 0.5 |
| *17 | — | Fe₂O₃ | 0.4 | 5 | No | 2.1 | 0 |
| *18 | No | Fe₂O₃ | 0.05 | 0.3 | WO₃ | 20 | 0.2 |
| *19 | Done | Fe₂O₃ | 28 | 1 | WO₃ | 11.4 | 1.4 |
| *20 | No | Fe₂O₃ | 4.5 | 4 | WO₃ | 0.05 | 3 |
| *21 | Done | Fe₂O₃ | 5.3 | 2 | WO₃ | 43 | 2 |
| *22 | Done | Fe₂O₃ | 5.3 | 3 | WO₃ | 2 | 4 |
| *23 | Done | Fe₂O₃ | 0.6 | 2.4 | WO₃ | 1.5 | 1 |

| | Material powder | | Sintering additive powder | | | |
|---|---|---|---|---|---|---|
| | | | Sintering additive powder 1 | | Sintering additive powder 2 | |
| Sample No. | Content of Si₃N₄ powder (% by weight) | Content of Si powder (% by weight) (Si₃N₄-basis) | Composition | Content (% by weight) | Composition | Content (% by weight) |
| 1 | 10.3 | 70 | Y₂O₃ | 14 | Al₂O₃ | 5.4 |
| 2 | 10 | 70 | Y₂O₃ | 13 | Al₂O₃ | 6 |
| 3 | 10 | 70 | Y₂O₃ | 13 | Al₂O₃ | 5 |
| 4 | 9.7 | 70 | Y₂O₃ | 12 | Al₂O₃ | 5 |
| | | | CaO | 1 | | |
| 5 | 9 | 68.3 | Y₂O₃ | 13 | Al₂O₃ | 4 |
| 6 | 11.1 | 70 | Y₂O₃ | 13 | Al₂O₃ | 5 |
| | | | SiO₂ | 2 | | |
| 7 | 10.5 | 70 | Y₂O₃ | 13 | Al₂O₃ | 5.6 |
| 8 | 8 | 68 | Lu₂O₃ | 9.5 | SiO₂ | 4 |
| 9 | 8.9 | 70 | Y₂O₃ | 12 | Al₂O₃ | 4 |
| 10 | 10 | 70 | Y₂O₃ | 13 | Al₂O₃ | 4.2 |
| 11 | 11 | 70 | Y₂O₃ | 13 | Al₂O₃ | 4 |
| 12 | 11.1 | 70 | Y₂O₃ | 13 | Al₂O₃ | 5 |
| 13 | 12 | 71 | ZrO₂ | 8.5 | Al₂O₃ | 6.6 |
| | | | MgO | 3.5 | | |
| 14 | 10 | 67 | Y₂O₃ | 11.3 | Al₂O₃ | 3 |
| 15 | 10 | 69.2 | Y₂O₃ | 12 | Al₂O₃ | 4.5 |
| *16 | 9 | 69 | Y₂O₃ | 17 | Al₂O₃ | 3 |
| *17 | 9 | 70 | Y₂O₃ | 12 | Al₂O₃ | 4 |
| *18 | 9 | 71 | Y₂O₃ | 13 | Al₂O₃ | 6.5 |
| *19 | 9 | 70 | Y₂O₃ | 12.6 | Al₂O₃ | 6 |
| *20 | 9 | 69 | Y₂O₃ | 12 | Al₂O₃ | 3 |
| *21 | 10 | 70 | Y₂O₃ | 13 | Al₂O₃ | 3 |
| *22 | 10 | 68 | Y₂O₃ | 13 | Al₂O₃ | 2 |
| *23 | 80 | 0 | Y₂O₃ | 12.6 | Al₂O₃ | 4 |

Samples marked with the symbol * are out of the scope of the present invention.

TABLE 2

| | | | Firing | Silicon nitride sintered material | | | | | |
|---|---|---|---|---|---|---|---|---|---|
| | | | Partial pressure | Neighboring phase | | | | Fracture | Cracks upon |
| Sample No. | Degreasing atmosphere | Nitriding | of nitrogen (kPa) | Presence | Type | Content (% by volume) | Strength (MPa) | toughness (MPa·m$^{1/2}$) | thermal shock test at 650° C. |
| 1 | Nitrogen | Done | 100 | Present | A | 0.1 | 880 | 6.7 | None |
| 2 | Nitrogen | Done | 120 | Present | B | 0.5 | 820 | 6.4 | None |
| 3 | Nitrogen | Done | 90 | Present | B | 1 | 870 | 6.5 | None |
| 4 | Nitrogen | Done | 150 | Present | A | 1.7 | 780 | 6.6 | None |
| 5 | Nitrogen | Done | 120 | Present | A | 2.5 | 810 | 6 | None |
| 6 | Nitrogen & argon | Done | 120 | Present | B | 0.4 | 870 | 6.2 | None |
| 7 | Nitrogen | Done | 120 | Present | A | 0.6 | 870 | 6.8 | None |
| 8 | Nitrogen | Done | 120 | Present | A | 5 | 730 | 5.5 | None |
| 9 | Nitrogen | Done | 120 | Present | B | 2.2 | 800 | 6.1 | None |
| 10 | Nitrogen | Done | 120 | Present | A | 1.2 | 820 | 6.6 | None |
| 11 | Nitrogen | Done | 120 | Present | A | 0.4 | 800 | 6.3 | None |
| 12 | Nitrogen | Done | 120 | Present | C | 0.3 | 790 | 6 | None |
| 13 | Nitrogen | Done | 120 | Present | C | 0.6 | 750 | 5.5 | None |
| 14 | Nitrogen | Done | 120 | Present | A | 3.2 | 800 | 6.3 | None |
| 15 | Nitrogen | Done | 120 | Present | A | 1.6 | 810 | 6.6 | None |
| *16 | Nitrogen | Done | 120 | None | — | — | 620 | 4.9 | Present |
| *17 | Nitrogen | Done | 120 | None | — | — | 600 | 4.6 | Present |
| *18 | Nitrogen | No | 120 | None | — | — | 550 | 4.9 | Present |
| *19 | Argon | Done | 120 | None | — | — | 580 | 4.7 | Present |
| *20 | Nitrogen & argon | Done | 120 | None | — | — | 600 | 4.6 | Present |
| *21 | Nitrogen | Done | 70 | None | — | — | 530 | 4.9 | Present |
| *22 | Nitrogen | No | 70 | | Sample cracked during firing | | | | |
| *23 | Nitrogen | — | 90 | None | — | — | 560 | 4.8 | Present |

Samples marked with the symbol * are out of the scope of the present invention.

EXAMPLE 2

An iron oxide ($Fe_2O_3$) powder having a mean particle size of 0.8 μm and a $WO_3$ powder having a mean particle size of 1 μm or less were mixed in a wet process using water, and the resultant slurry was dried at 100° C. thereby to prepare the preliminarily mixed powder. The preliminarily mixed powder, a silicon nitride ($Si_3N_4$) powder (mean particle size of 1 μm, 90% turned into a phase, Fe impurity content 100 ppm), a Si powder (mean particle size of 3 μm or less, Fe impurity content 200 ppm) and a sintering additive comprising a powder of $Y_2O_3$ having a mean particle size of 1 μm and a powder of $Al_2O_3$ having a mean particle size of 0.7 μm were mixed, granulated and molded so as to make a plurality of compacts having disk shape measuring 60 mm in diameter and 45 mm in thickness similarly to Example 1. The compacts thus obtained were degreased by heating at 600° C. in nitrogen atmosphere for 3 hours. Weight proportions of the iron oxide powder, the $WO_3$ powder, the silicon nitride powder, the Si powder, the $Y_2O_3$ powder and the $Al_2O_3$ powder were set to 1: 0.8: 10.3: 69.3: 13.6: 5 (weight proportion of iron oxide powder was Fe-basis, the weight proportion of the $WO_3$ powder was W-basis, the weight proportion of the Si powder was $Si_3N_4$-basis). Measurement of the specific surface area of the degreased material by a BET method showed values in a range from 10 to 15 m$^2$/g.

The degreased compacts were placed in a mortar made of carbon lined with silicon nitride on the surface, and were nitrided in an atmosphere consisting substantially of nitrogen with partial pressure of 150 kPa at temperatures and holding times in three steps shown in Table 3, then the temperature was raised further and fired at 1500° C. with partial pressure of nitrogen of 120 kPa for 3 hours, 1770° C. for 10 hours and 1800° C. with partial pressure of nitrogen of 200 kPa for 3 hours, thereby to make samples of the present invention constituted from type β silicon nitride sintered material.

The bending strength of the samples was measured similarly to Example 1. Cut surface of the sintered body was polished to mirror finish, and X-ray micro analyzer (JXA-8600M manufactured by JEOL, Ltd.) was used to identify W silicide, Fe silicide and silicide containing W and Fe. It was determined whether there was crystal containing these silicides disposed adjacent to each other (neighboring phase), and the content thereof was measured. Mean grain size of the neighboring phase was also measured. Grain length of the silicon nitride crystal was measured on SEM photograph and mean grain size was determined. Contents of W and Fe in the samples after 4-point bending test were measured by ICP emission spectrochemical analysis. Presence of $WSi_2$ and $FeSi_2$ crystal phases was checked by powder X-ray diffraction analysis. Thermal shock test was conducted at 650° C. similar to Example 1 and the presence of crack in the samples was examined. Furthermore, the test piece was heated to 750° C. with a heater block and was put into water of 25° C., to determine whether cracks occurred.

Test results showed that neighboring phase where at least two of W silicide, Fe silicide and silicide containing W and Fe adjoin each other was observed in all of samples Nos. 24 through 30, and mean grain length was 15 μm or less. Thus the samples showed high strength and high fracture toughness, with no crack in thermal shock test at 650° C.

Samples Nos. 29, 30 had content of neighboring phase of 2% by volume or higher, and showing crack in thermal shock test at 750° C. Existence of $W_5Si_3$ in sample No. 29 and existence of $Fe_2Si$ in sample No. 30 were clearly confirmed.

TABLE 3

| Sample No. | Si powder Mean grain size (μm) | Conditions of nitriding | | | | | |
|---|---|---|---|---|---|---|---|
| | | Step 1 | | Step 2 | | Step 3 | |
| | | Temperature (° C.) | Holding time (hr) | Temperature (° C.) | Holding time (hr) | Temperature (° C.) | Holding time (hr) |
| 24 | 1 | 1100 | 10 | 1200 | 5 | 1300 | 5 |
| 25 | 19 | 1100 | 10 | 1200 | 5 | 1260 | 10 |
| 26 | 21 | 1100 | 10 | 1200 | 10 | 1260 | 10 |
| 27 | 42 | 1100 | 20 | 1200 | 20 | 1260 | 20 |
| 28 | 11 | 1100 | 5 | 1200 | 10 | 1300 | 10 |
| 29 | 50 | 1050 | 5 | NA | | 1260 | 5 |
| 30 | 60 | NA | | 1200 | 5 | 1260 | 5 |

| Sample No. | Silicon nitride sintered material | | | | | | | |
|---|---|---|---|---|---|---|---|---|
| | Mean grain length (μm) | Neighboring phase | | | Content (% by volume) | Fracture toughness (MPa·m$^{1/2}$) | Strength (MPa) | Cracks upon thermal shock test | |
| | | Presence | WSi$_2$ | FeSi$_2$ | | | | 650° C. | 750° C. |
| 24 | 12 | Present | Present | Present | 1 | 5.3 | 750 | None | None |
| 25 | 13 | Present | Present | Present | 0.4 | 6.4 | 800 | None | None |
| 26 | 12 | Present | Present | Present | 0.5 | 6.5 | 820 | None | None |
| 27 | 8 | Present | Present | Present | 1 | 6.7 | 850 | None | None |
| 28 | 6 | Present | Present | Present | 0.7 | 6 | 810 | None | None |
| 29 | 12 | Present | None | None | 2 | 5.6 | 750 | None | Present |
| 30 | 15 | Present | None | None | 2.2 | 5.8 | 750 | None | Present |

EXAMPLE 3

An iron oxide (Fe$_2$O$_3$) powder having a mean particle size of 0.3 μm and a WO$_3$ powder having a mean particle size of 0.4 μm were mixed in proportions of 1:1 in terms of weight of Fe and W, and a preliminarily mixed powder was prepared similarly to Example 1. The preliminarily mixed powder was mixed with the same silicon nitride powder and Si powder as those of Example 2, while an iron oxide powder, a WO$_3$ powder, a silicon nitride powder and a Si powder (Si$_3$N$_4$-basis) were weighed according to proportions of 1% by weight, 1% by weight, 10% by weight and 70% by weight (82% by weight in total), respectively, to provide the base composition.

Then a powder of Y$_2$O$_3$ having a mean particle size of 0.5 μm, a powder of Al$_2$O$_3$ having a mean particle size of 3 μm and a SiO$_2$ powder having a mean particle size of 2 μm in total proportion of 18% by weight were mixed. All of the powders described above were mixed, granulated and degreased in procedures similar to those of Example 2, thereby to make the degreased compacts. The degreased compacts were placed in a mortar made of silicon nitride, and were heated in an atmosphere consisting substantially of nitrogen with partial pressure of 150 kPa in steps of 1050° C. for 20 hours, 1120° C. for 10 hours, 1170° C. for hours and 1300° C. for 3 hours (temperature was raised at a rate of 25° C. per hour between the successive steps), thereby to nitride Si into Si$_3$N$_4$ with 90% or more being turned into a phase. Then the temperature was raised further to 1500° C. in an atmosphere with partial pressure of nitrogen of 120 kPa for 3 hours, 1770° C. for 10 hours, then 1800° C. in an atmosphere with partial pressure of nitrogen of 200 kPa for 3 hours, thereby to make samples of the present invention constituted from type β silicon nitride sintered material.

Test pieces were cut out of the samples thus obtained, similarly to Example 1, and the bending strength and fracture toughness were measured. Contents of Y$_2$O$_3$ and Al$_2$O$_3$ were determined by quantitative analysis of Y and Al by ICP emission spectroscopy and converting the measurements into the contents of Y$_2$O$_3$ and Al$_2$O$_3$ (sum of the contents of Y$_2$O$_3$ and Al$_2$O$_3$ will be denoted as G). SiO$_2$ content was determined by measuring the total oxygen content with an oxygen analyzer manufactured by LECO Inc., subtracting the oxygen content included in the sum G of the contents of Y$_2$O$_3$ and Al$_2$O$_3$ from the total oxygen content, and converting the oxygen content in the remainder was converted to SiO$_2$ content. The grain size of silicon nitride was determined by measuring the sizes of grain in a region of 200 μm by 200 μm of a cut surface of the sintered body that was polished to mirror finish. Presence of neighboring phase in each sample was checked similarly to Example 1, and crystal structure of the neighboring phase was analyzed by means of a TEM.

It was found that samples Nos. 31 through 41 contained neighboring phase consisting of W silicide and Fe silicide or neighboring phase consisting of W—Fe silicide (third silicide) and Fe silicide, and that the neighboring phase included the neighboring phase where W silicide was surrounded by Fe silicide or the neighboring phase where W—Fe silicide (third silicide) was surrounded by Fe silicide. The metal silicide crystal contained in these neighboring phases were FeSi$_2$ in the case of silicide containing Fe, and WSi$_2$ in the case of silicide containing W. As shown in Table 4, samples Nos. 31 through 41 showed high strength and high fracture toughness. Samples Nos. 32 through 35 and 38 through 40 where molar ratio SiO$_2$/RE$_2$O$_3$ was in a range from 0.2 to 10 and molar ratio Al$_2$O$_3$/RE$_2$O$_3$ was in a range from 0.2 to 5 had relative density higher than 97%, and showed particularly high strength and high fracture toughness.

Sample No. 31 where ratio $SiO_2/RE_2O_3$ was less than 0.2 had relative density of 97%, and sample No. 36 where ratio $Al_2O_3/RE_2O_3$ was less than 0.2 had relative density of 96%, both showing no significant improvement in the strength because voids located inside could not be decreased significantly. Sample No. 37 where ratio $SiO_2/RE_2O_3$ exceeded 10 had a high relative density of 99%, although crystal phase was not dispersed sufficiently uniformly in the grain boundary layers, resulting in no significant improvement in the strength and fracture toughness. Sample No. 41 where molar ratio $Al_2O_3/RE_2O_3$ exceeded 5 had a high relative density of % and high strength, although no significant improvement was achieved in fracture toughness.

TABLE 4

| Sample No. | Molar ratio $SiO_2/RE_2O_3$ | Molar ratio $Al_2O_3/RE_2O_3$ | Strength (MPa) | Fracture toughness ($MPa \cdot m^{1/2}$) |
|---|---|---|---|---|
| 31 | 0.1 | 0.8 | 660 | 6.2 |
| 32 | 0.2 | 0.7 | 730 | 6.3 |
| 33 | 1.1 | 0.7 | 900 | 6.7 |
| 34 | 4 | 0.8 | 820 | 6.4 |
| 35 | 10 | 0.9 | 770 | 6 |
| 36 | 15 | 0.8 | 680 | 6.1 |
| 37 | 1 | 0.12 | 620 | 5.6 |
| 38 | 1.2 | 0.2 | 740 | 6.7 |
| 39 | 1.4 | 2.4 | 860 | 6.2 |
| 40 | 1.1 | 5 | 870 | 6.4 |
| 41 | 1.2 | 6.3 | 800 | 5.2 |

EXAMPLE 4

A plurality of samples were made similarly to samples Nos. 31 through 35 of Example 3, except for setting the temperature lowering rate from the maximum temperature to 800° C. to 200° C. per hour in the firing process, and 4-point bending strength was measured according to JIS R1601. Test pieces for 4-point bending strength test prepared according to JIS R1601 were subjected to oxidation treatment at 1000° C. in air atmosphere for 10 hours before being tested to measure 4-point bending strength. Test pieces that had been subjected to oxidation treatment and test pieces that had not been subjected to oxidation treatment were analyzed by X-ray diffraction on the surface, so as to identify the crystal phase on the surface.

All the test pieces that had not been subjected to oxidation treatment showed high strength, but sample No. 42 contained melilite phase ($RE_2Si_3O_3N_4$) in the grain boundary layer and therefore underwent marked change in color on the surface during oxidation treatment and-minute cracks, thus resulting in remarkable decrease in strength of the test piece after the oxidation treatment.

In samples Nos. 43 through 46 containing at least one of amorphous glass phase, apatite phase and di-silicate phase in the grain boundary layer before the oxidation treatment, on the other hand, at least one of apatite phase, Wollastonite phase and di-silicate phase was contained in the grain boundary layer after the oxidation treatment, and high strength was maintained after the oxidation treatment. High strength of the test piece after the oxidation treatment is supposedly due to optimization of the crystal phase (at least one kind of apatite phase, Wollastonite phase and di-silicate phase) formed in the grain boundary layers and disappearance of grounding scratches from the surface of the test piece due to the grain boundary phase formed on the surface.

Samples Nos. 43 through 46, where amorphous phase (glass phase) contained in the grain boundary layers was crystallized to form at least one kind of apatite phase, Wollastonite phase and di-silicate phase, all showed bending strength of 700 MPa or higher at 800° C., proving improvement in strength at high temperatures.

TABLE 5

| Sample No. | Sample No. in Example 3 | Before oxidation treatment Phase included in grain boundary layer | Strength (MPa) | After oxidation treatment Phase included in grain boundary layer | Strength (MPa) |
|---|---|---|---|---|---|
| 42 | 31 | Melilite phase | 660 | Melilite phase | 320 |
| 43 | 32 | Glass phase & apatite phase | 730 | Wollastonite phase & apatite phase | 770 |
| 44 | 33 | Glass phase | 900 | Apatite phase | 950 |
| 45 | 34 | Glass phase & di-silicate phase | 820 | Di-silicate phase | 970 |
| 46 | 35 | Glass phase | 770 | Di-silicate phase | 820 |

EXAMPLE 5

A $Fe_2O_3$ powder (mean particle size 0.3 μm) and a $WO_3$ powder (mean particle size 0.4 μm) were mixed preliminarily similarly to Example 1. A silicon nitride powder (mean particle size 1 μm, 90% turned into a phase, Fe impurity content 200 ppm) and a Si powder (mean grain size of 3 μm or less, Fe impurity content 300 ppm) were prepared. The preliminarily mixed powder thus obtained was used mix 100 parts by weight of a powder consisting of a $Fe_2O_3$ powder, a $WO_3$ powder, a silicon nitride powder and a Si powder in weight proportions of 10:70:1:1 (weight proportion of iron oxide powder is Fe-basis, the weight proportion of a $WO_3$ powder is W-basis and the weight proportion of Si powder is $Si_3N_4$-basis) with 15 parts by weight of a $Y_2O_3$ powder having a mean particle size of 0.5 μm or less, 7 parts by weight of $Al_2O_3$ powder having a mean particle size of 0.7 μm and 1 part by weight of a $SiO_2$ powder having a mean particle size of 2 μm, and granulated similarly to Example 1. The granulated powder was molded with a pressure of 80 MPa to form compacts of cylindrical shape measuring 200 mm in length, 150 mm in outer diameter and 130 mm in inner diameter. The compacts were degreased similarly to Example 1 and were nitrided and fired similarly to Example 1. The compacts were placed in a furnace so that the axis of the cylindrical shape lied horizontally.

The silicon nitride sintered material thus obtained was somewhat flattened in the radial direction by gravity. Deformation ratio (%) was determined as {(maximum outer diameter)−(minimum outer diameter)}/(maximum outer diameter)×100. Area proportion of the grain boundary layers was determined by measuring the area of the grain boundary layers excluding the silicon nitride crystal in a region of 200 μm by 200 μm (40000 μm² in area) of a cut surface of the sintered body that was polished to mirror finish, and dividing the area of the grain boundary layers by 40000 μm². The area proportion was multiplied by 100 to give the content of the grain boundary layers (% by volume).

As shown in Table 6, sample No. 51 where content of the grain boundary layers exceeded 20% by volume showed excessive deformation, while samples Nos. 47 through 50 where content of the grain boundary layers was not higher than 20% by volume showed smaller deformation.

TABLE 6

| Sample No. | Content of the grain boundary layers (% by volume) | Deformation ratio (%) |
| --- | --- | --- |
| 47 | 5 | 3 |
| 48 | 8 | 6 |
| 49 | 12 | 11 |
| 50 | 20 | 19 |
| 51 | 27 | 52 |

INDUSTRIAL APPLICABILITY

The silicon nitride sintered material of the present invention can be preferably used in such applications as follows.

The applications include molten aluminum handling members such as stoke, burner tube, heater tube and TC protective tube for low-pressure casting of aluminum, die cast sleeve, burner tube, heater tube, thermocouple protective tube, ladle and casting mold for die cast process, piston, sleeve, nozzle, piston holding component and other members of hot chamber.

The silicon nitride sintered material can be preferably used in metal processing members such as squeeze roll and skid button for hot rolling process, forging die, quenching fixture for induction hardening, sputtering nozzle and air pin for welding operation and lining material for wear resistance at high temperatures:

The silicon nitride sintered material can also be preferably used in members of crushing machines such as disk, sleeve, nozzle, liner, roll and medium of crushing machine, tank and arm member of mixer, sleeve and bushing of centrifugal separator, and in various products such as cutter, cooking knife, tools, paper mill, ink jet, fluid bearing, bearing balls for machine tool or hard disk, fishing tool, yarn guide and members for molding die.

The silicon nitride sintered material can also be preferably used in wire roller, wire guide and insulation plate for electric discharge machine, capstan, bending roll and spinning roll for or plastic processing of metals, members of can making equipment and insulation members of laser machining tool.

The silicon nitride sintered material can also be preferably used in wear resistant seal ring of excavating machine, large vertical bearing for pumping member, ball valve for high temperature operation and other pumping members.

The silicon nitride sintered material can also be preferably used in burner ring and flame sustaining ring of burner members for thermal power generation, lining member and nozzle of members for wear resistance at high temperatures.

Heat resistance, wear resistance and consistent strength without variability of the silicon nitride sintered material can be advantageously made use of in turbo-rotor, cam roller, swirl chamber, exhaust control valve, suction and exhaust valve, rocker arm, piston pin, seal ring, fuel injection pump members containing high pressure members, glow plug, ceramic heater and other automobile engine parts, head liner, cylinder liner, piston crown, valve, valve guide and other gas engine parts, gas turbine members such as turbine rotor, combustor, various rings and various nozzles, and other ceramic components of engine.

The invention claimed is:

1. A silicon nitride sintered material comprising a silicon nitride crystal and a grain boundary layer that contains at least two of first through third metal silicides selected from the group consisting of a first metal silicide, a second metal silicide and a third metal silicide,
wherein said grain boundary layer has a neighboring phase where at least two of said first through third metal silicides exist in contact with each other;
wherein said first metal silicide is a metal silicide comprising, as a first metal element, at least one selected from the group consisting of Fe, Cr, Mn and Cu;
where said second metal silicide is a metal silicide comprising, as a second metal element, at least one of W or Mo; and
wherein said third metal silicide is a metal silicide comprising a plurality of metal elements including said first metal element and said second metal element.

2. The silicon nitride sintered material according to claim 1, wherein said first metal element is Fe and said second metal element is W.

3. The silicon nitride sintered material according to claim 1, wherein said neighboring phase is formed such that said first metal silicide surrounds said second metal silicide or said third metal silicide.

4. The silicon nitride sintered material according to claim 2, wherein said neighboring phase is formed such that said first metal silicide surrounds said second metal silicide or said third metal silicide.

5. The silicon nitride sintered material according to claim 3, wherein crystal grains of said silicon nitride crystal has a mean grain size of 15 μm or less.

6. The silicon nitride sintered material according to claim 3, wherein the total content of said first metal element in said silicon nitride sintered material is in a range from 0.2 to 10% by weight and that of said second metal element is in a range from 0.1 to 3% by weight, while the content of said first metal element is higher than that of said second metal element.

7. The silicon nitride sintered material according to claim 6, wherein said silicon nitride sintered material is made through firing and molding powders comprising: a Si powder or a mixture of a Si powder and a silicon nitride powder; a powder including a compound of said first metal element and having a mean grain size of 0.5 to 20 μm; and a powder including a compound of said second metal element and having a mean grain size of 0.1 to 5 μm.

8. The silicon nitride sintered material according to claim 1, wherein said neighboring phase is formed such that said second metal silicide surrounds said first metal silicide or said third metal silicide.

9. The silicon nitride sintered material according to claim 2, wherein said neighboring phase is formed such that said second metal silicide surrounds said first metal silicide or said third metal silicide.

10. The silicon nitride sintered material according to claim 8, wherein the total content of said first metal element in said silicon nitride sintered material is in a range from 0.01 to 2% by weight and that of said second metal element is in a range from 0.2 to 10% by weight, while the content of said second metal element is higher than that of said first metal element.

11. The silicon nitride sintered material according to claim 8, wherein said silicon nitride sintered material is made through firing and molding powders comprising: a Si powder or a mixture of a Si powder and a silicon nitride powder; a powder including a compound of said first metal element and having a mean grain size in a range from 0.1 to 5 μm; and a powder including a compound of said second metal element and having a mean grain size in a range from 1 to 30 μm.

12. A method for manufacturing a silicon nitride sintered material comprising:
preparing a material powder by mixing a preliminarily mixed powder that has been made by wet mixing and drying materials including a Si powder or a mixture of a Si powder and a silicon nitride powder; a compound of first metal element having a mean grain size in a range from 0.1 to 20 μm and having at least one selected from the group consisting of Fe, Cr and Mn; and a compound of second metal element having a mean grain size in a range from 0.1 to 30 μm and having at least one of W or Mo;

forming a compact including said material powder and an organic binder;

degreasing said organic binder in an atmosphere substantially consisting of nitrogen gas, argon gas or a mixed gas thereof to form a degreased compact;

transforming said degreased compact to a nitride material in a substantially nitrogen gas atmosphere; and firing said nitride material in a non-oxidizing atmosphere that contains nitrogen gas to form a sintered material.

13. The method for manufacturing a silicon nitride sintered material according to claim 12, wherein said preliminarily mixed powder comprises said compound of first metal element having a mean grain size in a range from 0.5 to 20 μm and said compound of second metal element having a mean grain size in a range from 0.1 to 5 μm, and wherein said silicon nitride sintered material is formed so that the total content of said first metal element in said silicon nitride sintered material is in a range from 0.2 to 10% by weight and that of said second metal element is in a range from 0.1 to 3% by weight, while the content of said first metal element is higher than that of said second metal element.

14. The method for manufacturing a silicon nitride sintered material according to claim 12, wherein the temperature lowering rate in the firing step is 50° C. per hour or faster.

15. The method for manufacturing a silicon nitride sintered material according to claim 12, wherein said preliminarily mixed powder comprises said compound of first metal element having a mean grain size in a range from 0.1 to 5 μm and said compound of second metal element having a mean grain size in a range from 1 to 30 μm, and wherein said silicon nitride sintered material is formed so that the total content of said first metal element in said silicon nitride sintered material is in a range from 0.01 to 2% by weight and that of said second metal element is in a range from 0.2 to 10% by weight, while the content of said second metal element is higher than that of said first metal element.

16. A molten-metal-resistant member comprising said silicon nitride sintered material according to claims 3.

17. A wear resistant member comprising said silicon nitride sintered material according to claim 3.

* * * * *